Jan. 31, 1956  C. B. BROWN  2,733,359
MEANS FOR IMPROVING OPERATING CHARACTERISTICS OF TRANSISTORS
Filed May 12, 1950  5 Sheets-Sheet 1

Inventor
CHARLES B. BROWN

By G. D. O'Brien
R. M. Hicks
Attorneys

Jan. 31, 1956  C. B. BROWN  2,733,359
MEANS FOR IMPROVING OPERATING CHARACTERISTICS OF TRANSISTORS
Filed May 12, 1950  5 Sheets-Sheet 2

Inventor
CHARLES B. BROWN

Jan. 31, 1956 C. B. BROWN 2,733,359
MEANS FOR IMPROVING OPERATING CHARACTERISTICS OF TRANSISTORS
Filed May 12, 1950 5 Sheets-Sheet 3

Inventor
CHARLES B. BROWN

Jan. 31, 1956     C. B. BROWN     2,733,359
MEANS FOR IMPROVING OPERATING CHARACTERISTICS OF TRANSISTORS
Filed May 12, 1950     5 Sheets-Sheet 4

Inventor
CHARLES B. BROWN

By J. D. O'Brien
R. M. Hicks     Attorneys

Jan. 31, 1956
C. B. BROWN
2,733,359
MEANS FOR IMPROVING OPERATING CHARACTERISTICS OF TRANSISTORS
Filed May 12, 1950
5 Sheets-Sheet 5
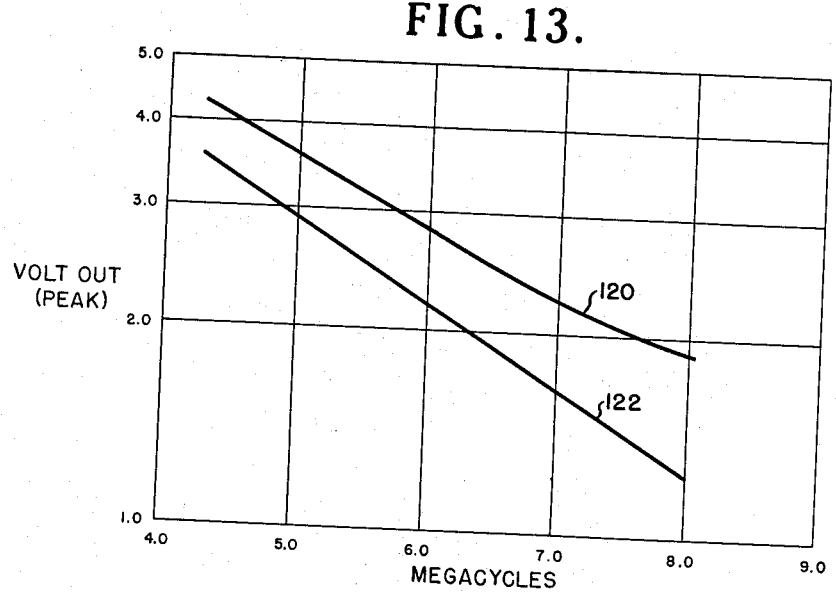
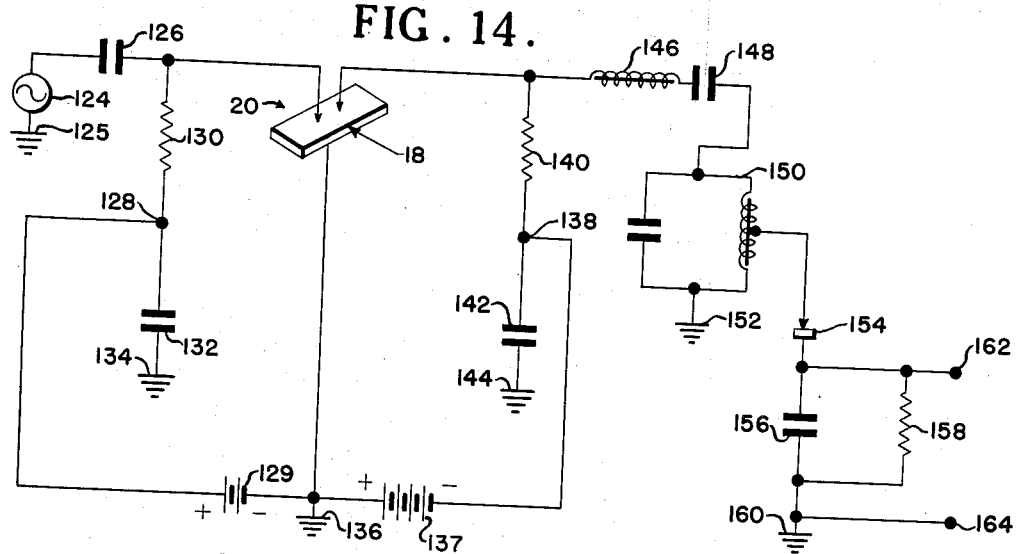
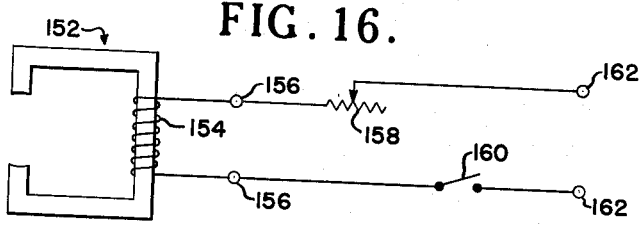
Inventor
CHARLES B. BROWN
By G. D. O'Brien
R. M. Hicks
Attorneys

United States Patent Office 2,733,359
Patented Jan. 31, 1956

2,733,359

MEANS FOR IMPROVING OPERATING CHARACTERISTICS OF TRANSISTORS

Charles B. Brown, Takoma Park, Md.

Application May 12, 1950, Serial No. 161,675

4 Claims. (Cl. 307—88.5)

(Granted under Title 35, U. S. Code (1952), sec. 266)

This invention relates to transistors and more particularly to magnetically biased transistors.

The name "transistor" has been given to the semiconductor amplifier triode which has been recently developed. It is a devise used in a solid circuit and which has translational characteristics. The transistor is capable of performing the same functions accomplished by the vacuum tube triode. However, when used as a semi-conductor amplifier, the transistor works on an entirely different principle than does the vacuum tube triode.

The fundamental differences between the transistor and a vacuum tube are that the transistor has neither a vacuum nor a filament. Therefore, no filament power is consumed and no warm-up time is required. The transistor is both smaller and lighter than any vacuum tube which is commercially available. Transistors have been successfully demonstrated in amplifiers of the radio-frequency, intermediate-frequency, and audio-frequency type, oscillators, pulse generators and mixers. A power amplification of at least 100 times can be obtained through the use of a transistor.

It has been found that transistors as presently used have high frequency limitations which cannot be corrected by circuit techniques. Specifically, the current gain function, $$\frac{(I \text{ collector})}{(I \text{ emitter})}$$

falls to a low value between 5 and 10 megacycles. High frequency performance is caused to deteriorate between 5 and 10 megacycles because of this falling off of the current gain function coupled with the unavoidable capacity effects of the collector element which cannot be entirely eliminated by circuit techniques.

My invention consists in the application of a magnetic field to a transistor in the region of the emitter and collector elements which are in contact with a crystal element, as hereinafter described. When phased in the proper direction this magnetic field increases the transistor performance by reducing the tendency of the current gain function to drop in value, especially at high frequencies.

Accordingly, the primary object of my invention is to improve the performance and increase the efficiency of transistors, especially when employed as high frequency amplifiers.

Another object is to reduce the loss in the current gain function, $$\frac{(I \text{ collector})}{(I \text{ emitter})}$$

of a transistor as the frequency of the input signal thereto is increased.

Another object is to increase the usable band width of output signal frequency of a transistor when used in a wide band amplifier.

A further object is to provide new and improved means for improving the output impulse signal of a transistor.

A still further object is to provide a new and improved device which can be used in conjunction with all circuit techniques which are commonly applied thereto to improve high frequency performance of a transistor.

Other objects and many of the attendant advantages of this invention will be readily appreciated as the same becomes better understood by reference to the following detailed description when considered in connection with the accompanying drawings wherein:

Fig. 13 represents peak voltage output versus frequency curves obtained by using the circuit of Fig. 12 with a collector current of 2 milliamperes;

Fig. 14 is a schematic circuit diagram of a 23-megacycle amplifier unit suitable for use with the present invention;

Fig. 16 is a schematic circuit diagram having the transistor and electromagnet of Fig. 15 disposed therein.

Figure 2:
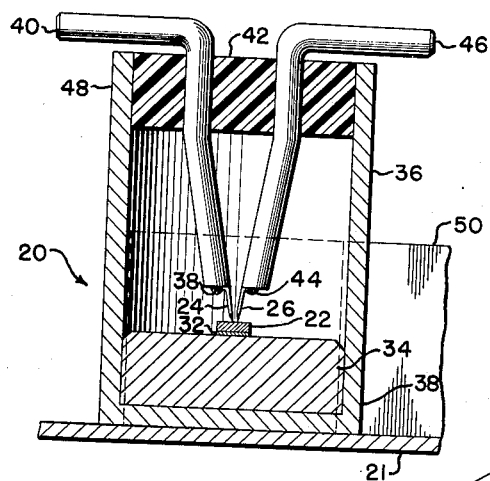
Fig. 2 is a sectional elevation view of the transistor and magnet taken on line 2—2 of Fig. 1.
Figure 4:
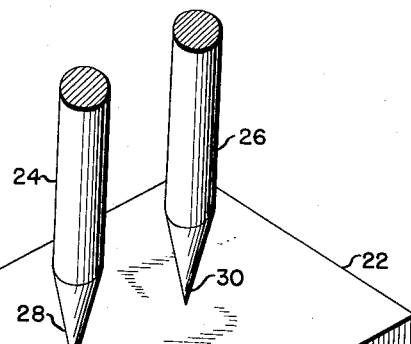
Fig. 4 is an enlarged view in perspective showing the arrangement of the electrodes of the transistor.

Referring particularly to Fig. 2 of the drawings on which the transistor is designated generally by the reference numeral 20 and comprises a small wafer 22 of a semi-conductor such as germanium. In the preferred embodiment of the invention wafer 22 is made from a slice of semi-conducting material, such, for example, as germanium which is preferably cut from a high-back-voltage ingot, ground flat on both sides, copper-plated and tinned on one side, and then diced into small squares or wafers. Two point contacts, respectively designated 24 and 26, are positioned side by side and close together so as to engage one surface of wafer 22. Contacts 24 and 26 will be designated as the emitter and collector, respectively, for purposes which will be made apparent hereinafter. The emitter and collector can be made, for example, of 0.005 inch Phosphor bronze wires, which have been bevel-ground and polished at one end so as to be pointed as best seen at 28 and 30, respectively, in Fig. 4. A base electrode 32 is provided on the opposite surface of wafer 22 and is a large-area contact. Wafer 22 and base electrode 32 are sweated, as a unit, onto a brass base plug 34. Base plug 34 having wafer 22 secured thereto is force-fitted into the cartridge 36 at the base end 38 thereof. One end of the emitter 24 is spot-welded, as shown at 38, to a supporting pin 40 which is molded into a cylindrical plug 42 made of insulating material. The collector 26 is similarly spot-welded, as shown at 44, to a supporting pin 46 which is also molded into cylindrical plug 42.

Figure 1:
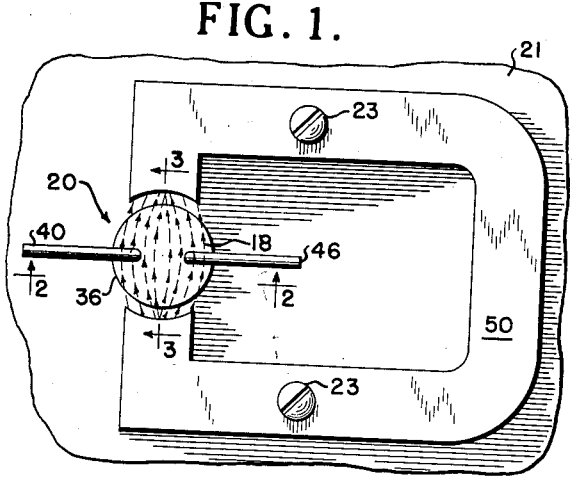
Fig. 1 is a top plan view of a transistor and magnet in accordance with a preferred embodiment of the invention.
Figure 3:
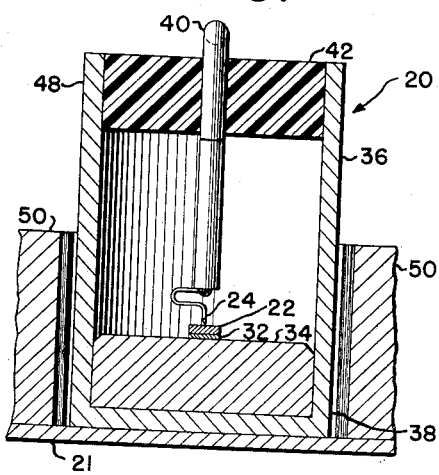
Fig. 3 is a sectional elevation view of the transistor and magnet taken on line 3—3 of Fig. 1.

After the emitter 24 and collector 26 have been secured to their respective supporting pins in any suitable manner, as by welding the parts together, they are bent into a cantilever shape as shown in Fig. 3. The assembly comprising emitter 24, collector 26, supporting pins 40 and 46, and cylindrical plug 42 is forcibly inserted into the other end 48 of cartridge 36 until the pointed end of the emitter 24 and collector 26 are each in contact with wafer 22. The cartridge 36 is filled with wax to improve its stability from a mechanical standpoint. The cartridge 36 forms the base connection of the unit. In the arrangement of Fig. 2 a permanent magnet 50 is positioned so that its field will pass through the transistor in the manner best shown by the flux line arrows 18 in Fig. 1. The magnet and transistor may be mounted in any convenient manner, such as, for example, by securing the magnet 50 to a plate 21 by screws 23.

Most of the electrons in a semi-conductor do not contribute to carrying the current but are normally held in fixed positions and bind the atoms together in a solid. Current is carried only if one of these electrons gets out of place, or if another electron is introduced into the semi-conductor material. If one of the electrons is removed from the semi-conductor, the hole left behind it can move like a bubble in a liquid and carry current. The loss or gain at high frequencies appears to be caused by transit time in the flow of holes from emitter to collector. The path of current flow along the surface of the semi-conductor has a transit time of about $1.3 \times 10^{-8}$ seconds while along other paths which are longer the transit time may be 2.6 to $3.9 \times 10^{-8}$ seconds or from two to three times longer than that for the surface paths. At high frequencies the effect of differences in transit angle will be an increased phase shift and also a reduction of current gain since the hole current arriving at the collector will be dispersed in phase. The hole current is defined herein as the current carried by the flow of holes within the semiconductor material. The transit angle is defined as the shift along the time axis between input current and output current in terms of a sine wave having an angular length of 360 degrees from peak to peak. Phase shift may be defined as the distance between peaks on input and output sine waves, usually expressed in terms of the transit angle, such as, for example, a phase shift of 30 degrees. If a transverse magnetic field is applied the hole current is compressed toward the surface of the wafer 22 thus reducing the transit time with a consequent reduction in phase dispersion. The current gain, as a result, is substantially aided as shown on Fig. 6, as will be more fully described hereinafter.

Figure 5:
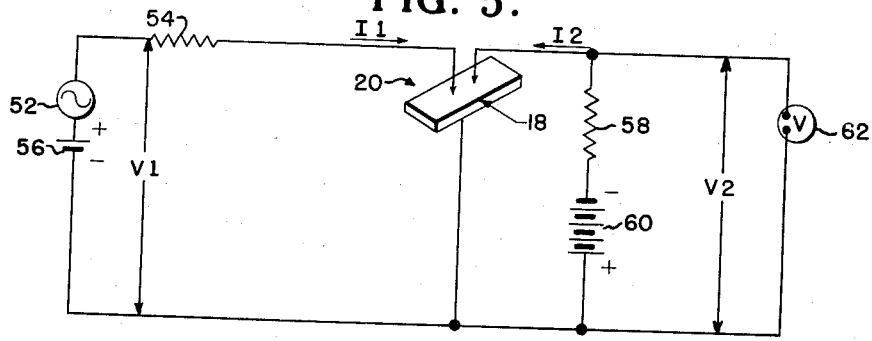
Fig. 5 is a schematic circuit diagram of a test circuit employing a transistor through which a magnetic field is directed.

Both emitter 24 and collector 26 are rectifiers. Emitter 24 is operated in the forward or low resistance direction of input current flow and collector 26 is operated in the reverse or high resistance direction of output current flow as shown in Fig. 5. When emitter 24 and collector 26 are disposed in closely spaced adjacency but not in contact with each other, the value of the current of emitter 24 greatly affects the voltage and current in the collector 26.

It is a characteristic feature of a transistor that if the current in the emitter 24 is increased, the current in the collector 26 is increased to a greater extent than the increase of current in the emitter 24, the collector voltage being held constant. Consequently, it follows that the transistor is a current amplifier having a current amplification factor of $$\alpha = \frac{\Delta I_2}{\Delta I_1}$$

where $\Delta I_2$ is the change in collector current and $\Delta I_1$ is the change in emitter current and which is greater than unity. It is to be noted that even if $\alpha$ were less than unity, power gains are still obtained since the current passes through the semi-conductor from a circuit having low resistance to one having a high resistance.

Fig. 5 discloses a test circuit in which 52 is an alternating current generator, 54 is a 10,000 ohm resistor for limiting the current in the emitter circuit, 56 is a bias battery of approximately 3 volts, 20 is a transistor, 58 is a 1000 ohm resistor, 60 is a 50 volt battery, and 62 is a vacuum tube voltmeter, and arrow 18 represents magnetic flux lines of approximately 20,000 lines per square inch. The reference characters $I_1$ and $V_1$ represent the emitter circuit current and voltage, respectively, and $I_2$ and $V_2$ designate the collector circuit current and voltage, respectively. The output voltage is the voltage in the collector circuit. This circuit is a testing circuit used in accordance with the present invention to obtain the curves shown in Figs. 6 and 7. It is to be understood, however, that Fig. 5 represents only a specific example and that the use of my invention is not limited to any particular circuit but is applicable to any circuit in which it is desired to improve the value of the current gain function.

Figure 6:
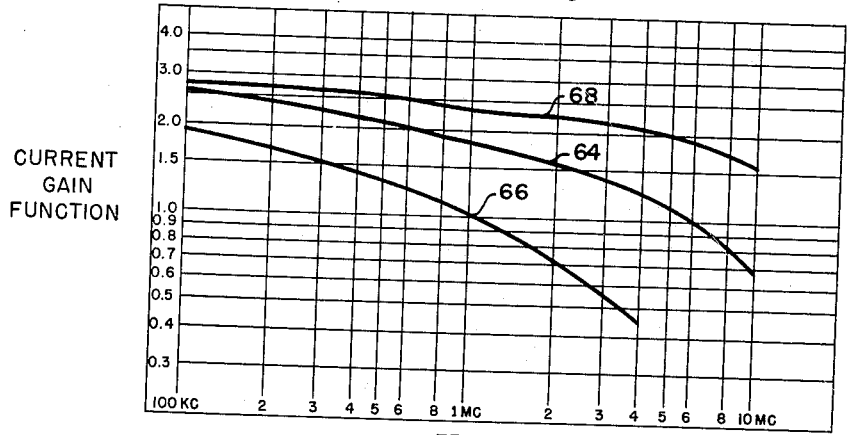
Fig. 6 is a graph of current gain plotted against frequency obtained from the circuit of Fig. 5.

It will be observed from an examination of Fig. 6 that $\alpha$, the current gain function, drops rapidly at high frequencies on curve 64 which represents the relationship of current gain to frequency and when no magnetic field is applied across the transistor. If a negative magnetic field of approximately 6900 gausses is applied across the transistor, $\alpha$ is reduced markedly over the entire frequency range and particularly in the high frequency portion of the curve as shown by curve 66. On the other hand, however, if a positive magnetic field of 6900 gausses is imposed so that the flux lines thereof pass through the transistor curve 68 is obtained which shows a greater current gain over the entire frequency range, as compared with curve 64 where no magnetic field was applied, which is especially obvious in the high frequency area. In the 5 to 10 megacycle range, for example, curve 64 develops a rather steep slope whereas the slope of curve 68 in the same range is relatively slight. At 8 megacycles, for instance, $\alpha$ is approximately 0.8 when no magnetic field is applied. However, if a magnetic field is applied $\alpha$ is approximately 1.6 at the same frequency or approximately twice as great as the value of $\alpha$ when no magnetic field is applied. Most of the reduction in high frequency gain is, therefore, recovered on the application of a positive magnetic field.

Figure 7:
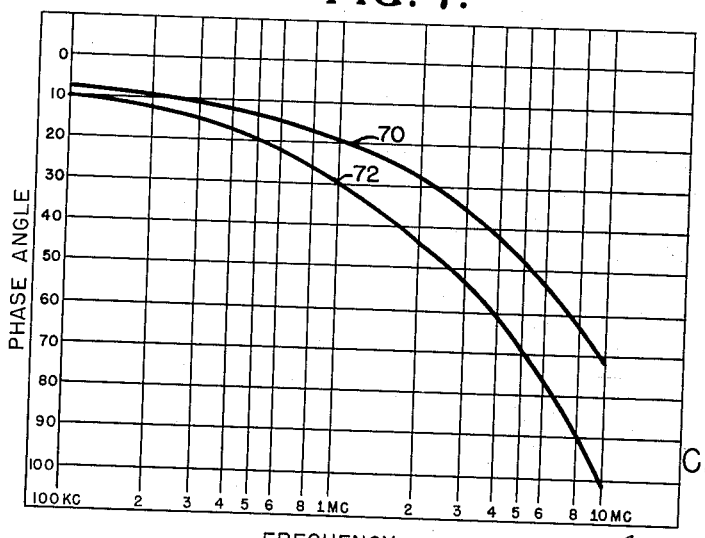
Fig. 7 is a graph showing representative curves when the phase angle is plotted against frequency similarly obtained from the circuit of Fig. 5.

Referring now to Fig. 7 on which is shown the phase angle of a transistor having no magnetic bias and that of a transistor having magnetic bias each being operated through a high frequency range, it is apparent that the phase angle is substantially reduced at high frequencies upon application of a positive magnetic field of 6900 gausses as shown by curve 70, appearing thereon, when compared with the phase angle at the same frequencies where no magnetic field is applied, as is shown by curve 72. This reduction in phase angle indicates that the transit time of the current caused by the flow of holes from emitter to collector has been decreased with a consequent increase in the current gain function. It has been found that a similar effect would be achieved by a small reduction in the strength of the magnetic field within which the transistor is disposed.

When the emitter current is small as compared to the collector current the field strength which reduces transit time of the flow of hole current from emitter to collector must be proportional to the collector current.

Figure 8:
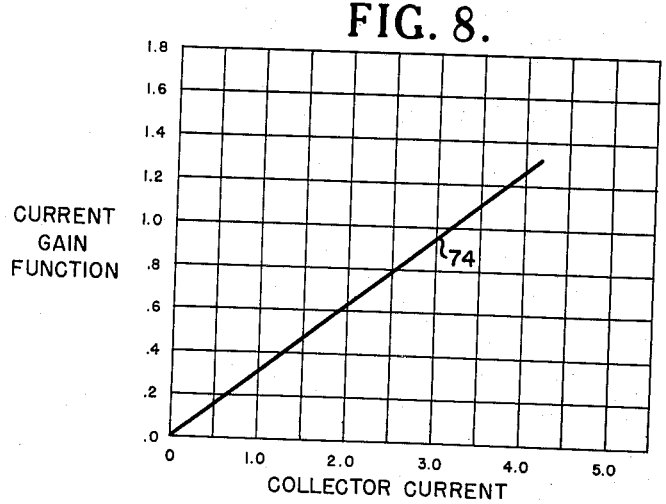
Fig. 8 is a graph on which is shown the relationship of the current gain to the collector current when the emitter current and the frequency of the input signal are held constant and a magnetic field is applied across the transistor as used in the circuit of Fig. 5.

If phase dispersion reduces the current gain function at high frequencies, a large portion of the reduction of the current gain function can be recovered by reducing transit time of the hole current flowing from the emitter to the collector. This result is shown by way of illustration in Fig. 8, wherein curve 74 is obtained by plotting the collector current as the abscissa against the current gain function as the ordinate for an emitter current of 0.46 milliampere and at an input signal frequency of 10 megacycles. As can be seen from the figure, the current gain ratio is proportional to the collector current which, in turn, is proportional to the magnetic field strength which shortens the transit time of the flow of hole current from the emitter to the collector. Inasmuch as the curves which would result from the other circuit arrangements shown in the drawings would be similar to Fig. 8 it is not deemed necessary to illustrate these curves.

Figure 9:
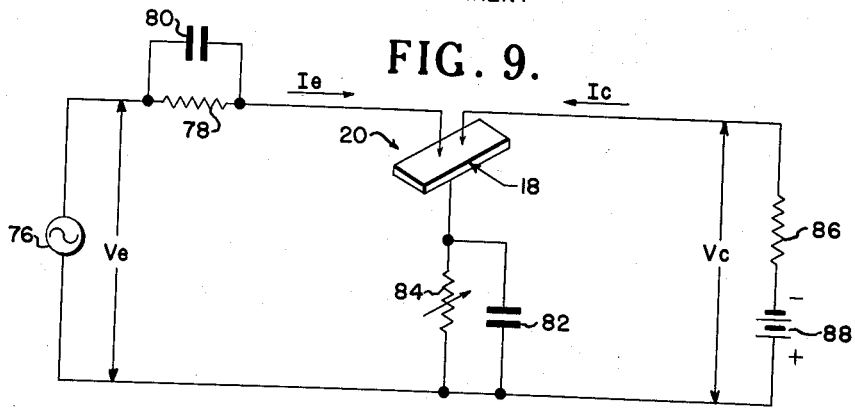
Fig. 9 is a schematic circuit diagram of an amplifier employed with the present invention.

Reference is now made to Fig. 9 which represents an amplifier circuit utilizing a transistor with a magnetic field applied thereacross wherein 76 is an alternating current generator, 78 is a 1500 ohm resistor, 80 is a 250 micromicrofarad condenser, 20 generally indicates a transistor, 82 is a 0.004 micromicrofarad condenser, 84 is a variable resistor connected to the base electrode of transistor 20, 86 is a 10,000 ohm resistor, 88 is a battery, and 18 represents a magnetic field applied across the transistor 20. Ie and Ic denote the emitter and collector currents, respectively. Ve and Vc, respectively, designate the emitter voltage and collector voltage. Connections between these various elements will be obvious to one skilled in the art from an inspection of Fig. 9.

Figure 10:
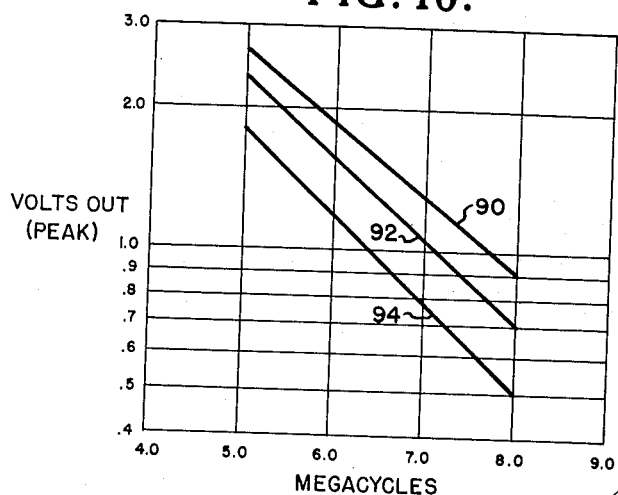
Fig. 10 represents curves obtained by plotting peak output voltages against frequency as a result of using the circuit of Fig. 9 with a collector current of 2 milliamperes.
Figure 11:
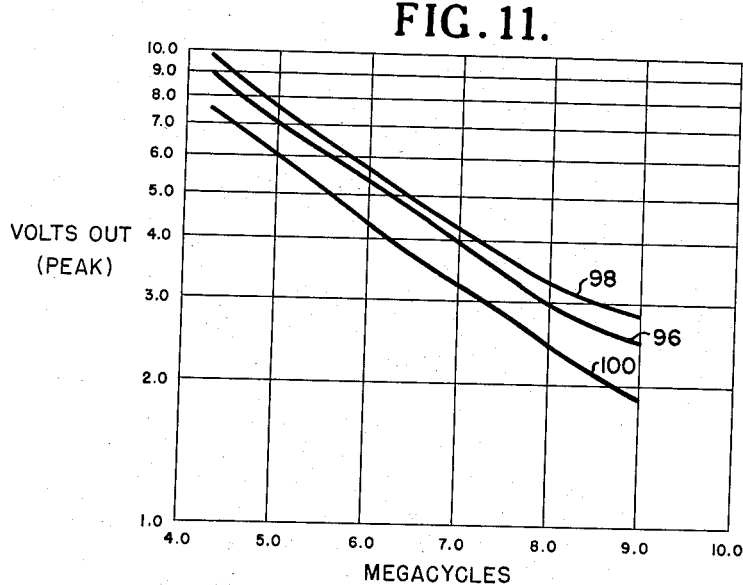
Fig. 11 represents peak voltages output versus frequency curves obtained by using the circuit of Fig. 9 with a collector current of 5 milliamperes.

The curves shown in Figs. 10 and 11 correspond to a collector current of 2 and 5 milliamperes respectively applied to the collector when connected in circuit as disclosed in Fig. 9.

Referring now to Fig. 10 it will be seen that when the peak output voltage is the ordinate and the frequency the abscissa and one is plotted against the other with the collector current being maintained constant at 2 milliamperes, curves 90, 92 and 94 are obtained by varying the magnetic field which is directed through the transistor 20. A positive magnetic field of approximately 20,000 lines per square inch imposed across the transistor, for example, produces curve 90. When no magnetic field is utilized curve 92 results. When the transistor is exposed to a negative magnetic field of approximately 20,000 lines per square inch, curve 94 is obtained. It will be readily seen from an inspection of curves 90 and 92 that for a frequency of 8 megacycles the peak voltage output is approximately 0.9 volt when the positive magnetic field is applied across the transistor and is only 0.7 volt when the transistor is under no controlled magnetic field influence.

In obtaining the curves shown in Fig. 11 the collector current was held constant at 5 milliamperes. Fig. 11 shows generally the same type of graph as that of Fig. 10, hereinbefore described. However, it will be noted that under the conditions of Fig. 11 wherein the collector current is two and a half times as great as that used in obtaining the curves of Fig. 10, the peak output voltage for a frequency of 9 megacycles is 2.5 volts when the transistor is not subjected to the influence of a magnetic field, as shown by curve 96, and is approximately 2.8 volts when the transistor is so subjected as shown by curve 98. A negative magnetic field imposed across the transistor produces curve 100 whereon the peak voltage output is only 1.9 volts at a frequency of 9 megacycles.

Figure 12:
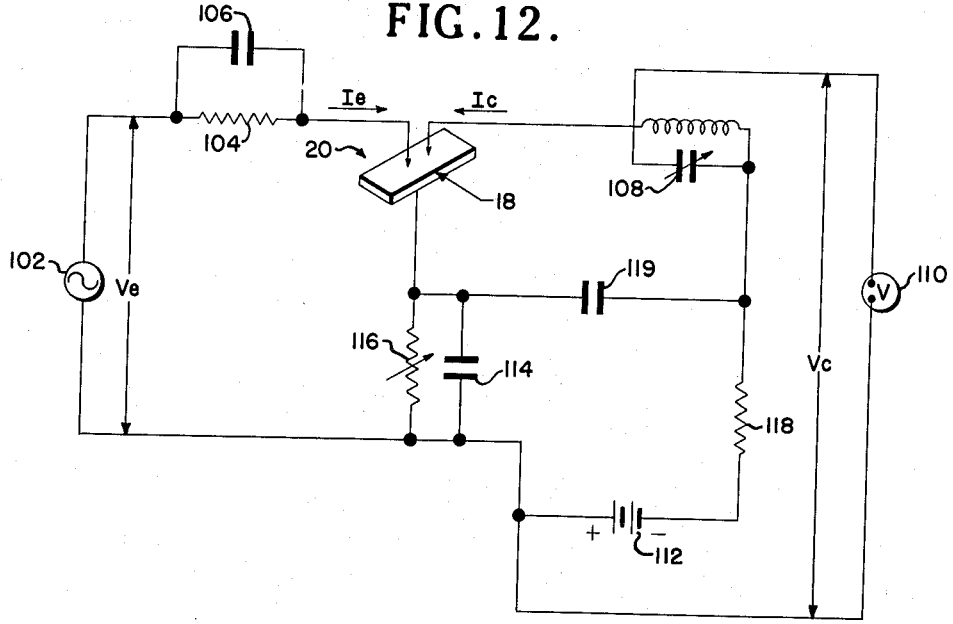
Fig. 12 is a schematic circuit diagram of a tuned amplifier circuit showing the use of the present invention therewith.

A tuned amplifier circuit with a magnetic field applied across the transistor thereof is shown in Fig. 12 wherein 102 is an alternating current generator, 104 is a 1500 ohm resistor, 106 is a 250 micromicrofarad condenser, 108 is a variable condenser which is tunable to the desired frequency, 110 is a vacuum tube voltmeter, 112 is a battery having approximately a 100 volt output, 114 is a 0.004 micromicrofarad condenser, 116 is a 1000 ohm variable resistor, 118 is a 10,000 ohm resistor, 119 is a 250 micromicrofarad condenser, 20 is a transistor and 18 represents a magnetic field applied across said transistor. Ie and Ic denote the emitter and collector currents, respectively, and Ve and Vc designate the emitter voltage and collector voltage, respectively.

By using the circuit shown in Fig. 12 and maintaining the collector current constant at 2 milliamperes the curves of Fig. 13 were obtained. Curve 120 shows that when a magnetic field is applied across the transistor 20 the peak voltage output is 0.7 volt greater than the output voltage when no controlled magnetic field is imposed through the transistor as shown by curve 122.

Referring now to Fig. 14, which is the circuit diagram for a 23 megacycle amplifier used for testing the high frequency response of transistors, it will be seen that 124 represents an alternating current generator which is connected on the input side of the circuit and grounded at 125, 126 is a 100 micromicrofarad condenser, 128 is a terminal connected to the positive terminal of a suitable low voltage source of direct current 129 such, for example, as 11 volts, the negative terminal of which is grounded at 136, 130 is a 27,000 ohm resistance, 132 is a 500 micromicrofarad condenser which is connected to ground at 134, 20 is a transistor, 18 represents a magnetic field applied to the transistor, the transistor 20 is connected to ground at 136, 138 represents a terminal connected to a source of direct current supply 137 for the collector circuit, such as, for example, a 100 volt battery having its negative terminal connected at 138 and its positive terminal grounded at 136, 140 is a high resistance of the order of 16,000 ohms, 142 is a 500 micromicrofarad condenser grounded at 144, 146 is an iron core inductance, 148 is a condenser of suitable capacitance, 150 is a tuning circuit capable of being tuned to high frequencies and grounded at 152, 154 is a diode of suitable size to meet the requirements of the circuit, 156 is a 75 micromicrofarad condenser, 158 is a 100,000 ohm resistor, condenser 156 and resistor 158 being grounded at 160. One terminal of the output circuit is represented at 162 while the other terminal thereof is denoted by 164 and is grounded at 160.

It will be observed that in Fig. 14 shunt feed is used in both the emitter and collector circuit in order to insure high D. C. stability. In this arrangement, it is possible to use a high value of emitter bias coupling resistance without unduly high bias voltage since the emitter current is only 0.4 milliampere. The collector or output network 146, 148 and 150 constitute a band pass, the impedance of which is high at frequencies within the band pass as well as at other frequencies. The input impedance is approximately 1000 ohms at 23 megacycles while the output impedance of 150 is 16,000 ohms in a specific instance, or a gain between input and output of 8, resulting in a band width gain of 8.8.

Figure 15:
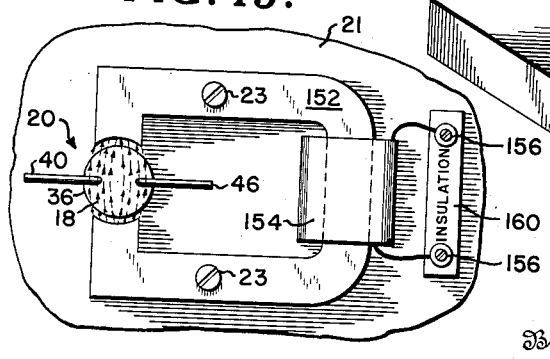
Fig. 15 is a top plan view of a transistor and an electromagnet disposed therearound in accordance with another form of the present invention.

Fig. 15, on which is shown another form of the present invention, is representative of another of the various means which may be utilized to impress a magnetic field across a transistor and in which is designated a transistor 20 with an electromagnet 152 disposed therearound having a coil 154 thereon, a pair of terminals 156 for the coil, and a mounting plate 21, the terminals being insulated from the plate by a terminal strip 160. Coil 154 may be connected in either a direct current circuit or in an alternating current circuit, as the case may be. Any means which will produce a magnetic field in a preferred direction across the transistor may obviously be advantageously utilized in the practice of the present invention.

Referring now to Fig. 16, wherein electromagnet of the transistor of Fig. 15 is shown connected to a circuit, it will be observed that 152 is an electromagnet having a coil 154 disposed therearound and a pair of terminals 156 electrically connected thereto and to a variable resistance 158 and a switch 160, the resistance and switch each being electrically connected with one of two similar terminals 162 which are adapted for connection with a source of any suitable input magnetizing current. The variable resistance 158 is used in order that the strength of the field across the element of semi-conductive material may be controlled through the adjustment of the variable resistance.

From the foregoing description it is apparent that the application of a controlled magnetic field in a preferred direction across a transistor in accordance with the present invention increases the available gain at high frequencies. This effect can be used to advantage to increase the upper frequency limit of wide band amplifiers which employ transistors. It can also be used in other types of electrical equipment as hereinbefore mentioned.

This description has been primarily directed to the Type "A" transistor, disclosed in "The transistor—a new semi-conductor amplifier," by J.A. Becker and J. N. Shive, appearing in March 1949 issue of Electrical Engineering, pages 215 to 221, with the exception that a controlled magnetic field has been added thereto. However, it is to be understood that the invention is not to be limited to the Type "A" transistor but may be applied with equal advantage to other types of transistors as well. Further, it is obvious that many variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. Apparatus for improving the operating characteristics of electrical equipment comprising the combination of a supporting means, a magnetic field generating means mounted on said supporting means, a metallic cartridge carried by said supporting means within said field, a wafer composed of semi-conductive material electrically connected to said cartridge and disposed therein and adjacent one end thereof and within said field, a plug composed of insulating material extening into the other end of said cartridge, a first supporting pin composed of conductive material extending longitudinally through said plug with one end of said pin exposed to the interior of said cartridge and spaced from said wafer and the other end of said pin arranged exteriorly of said cartridge, an emitter wire electrically connected to the inner end of said supporting pin and in contact with said wafer, a second supporting pin composed of conductive material extending longitudinally through said plug laterally spaced from said first supporting pin with one end of said second supporting pin arranged interiorly of said cartridge and spaced from said wafer, and the other end of said second pin arranged exteriorly of said cartridge, a collector wire electrically connected to the inner end of said second supporting pin and in contact with said wafer in closely spaced adjacency with said emitter wire.

2. In combination with a transistor of the type including a body of semi-conductive material and having emitter and collector electrodes each engaging a common surface of said body in spaced relatio nto each other, means including said emitter electrode for injecting mobile charges into said body of signs opposite the signs of the mobile charge normally present in excess in the body under equilibrium conditions, said collector electrode being biased in the reverse direction with respect to said body, and means for applying a magnetic field to said body transversely of the direction of current flow of mobile charge pairs through said body and substantially parallel to the surface of said body engaged by said emitter and collector electrodes, said magnetic field having a sign such that the current flow of mobile charge pairs is compressed towards said surface.

3. In a transistor including a body of semi-conductive material, a base electrode in non-rectifying contact with said body and emitter and collector electrodes each engaging a common surface of said body in spaced relation to each other, means including said emitter electrode for injecting mobile charges in said body of signs opposite the signs of the mobile charges normally in excess in the body under equilibrium conditions, means biasing said collector electrode in the reverse direction with respect to said body, and means for applying a magnetic field to said body transversely of a line connecting said collector and emitter electrodes and substantially parallel to said common surface of said body, said magnetic field having a sign such that the current flow of the mobile charges injected in said body by said emitter electrode is compressed towards said common surface.

4. The combination of claim 3 wherein said magnetic field applying means includes an electromagnet, and means for energizing said electromagnet with a current proportional to the current flow through said collector electrode.

References Cited in the file of this patent

UNITED STATES PATENTS

| | | |
|---|---|---|
| 817,664 | Pleeher | Apr. 10, 1906 |
| 1,765,607 | Ohl | June 24, 1930 |
| 2,553,490 | Wallace | May 15, 1951 |
| 2,553,491 | Shockley | May 15, 1951 |